United States Patent [19]

Renner

[11] 4,166,528
[45] Sep. 4, 1979

[54] LONGITUDINAL SUPPORT FOR A CONVEYOR BELT

[75] Inventor: Elmer J. Renner, Aurora, Ill.
[73] Assignee: Stephens-Adamson, Inc., Aurora, Ill.
[21] Appl. No.: 895,120
[22] Filed: Apr. 10, 1978
[51] Int. Cl.² .............................................. B65G 15/08
[52] U.S. Cl. ................................. 198/825; 193/35 R; 198/827
[58] Field of Search ............... 198/828, 827, 830, 825, 198/861, 860; 193/35 R

[56] References Cited

U.S. PATENT DOCUMENTS

| | | | |
|---|---|---|---|
| 1,255,695 | 2/1918 | Stephens | 198/830 X |
| 2,982,387 | 5/1961 | Hinckley | 193/35 R |
| 3,124,238 | 3/1964 | Tyler | 198/827 |
| 3,212,626 | 10/1965 | McLeish et al. | 198/830 X |

FOREIGN PATENT DOCUMENTS

| | | | |
|---|---|---|---|
| 782599 | 9/1957 | United Kingdom | 198/827 |
| 924191 | 4/1963 | United Kingdom | 198/825 |

Primary Examiner—Robert B. Reeves
Assistant Examiner—Douglas D. Watts
Attorney, Agent, or Firm—Robert C. Jones

[57] ABSTRACT

Individual longitudinal channels equipped with closely spaced wheels running the full length of the conveyor and suspended in a natural catenary fashion by cross support cables is disclosed.

5 Claims, 11 Drawing Figures

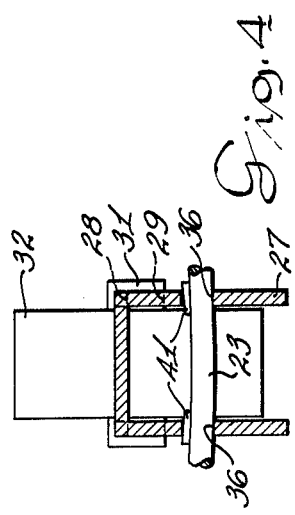
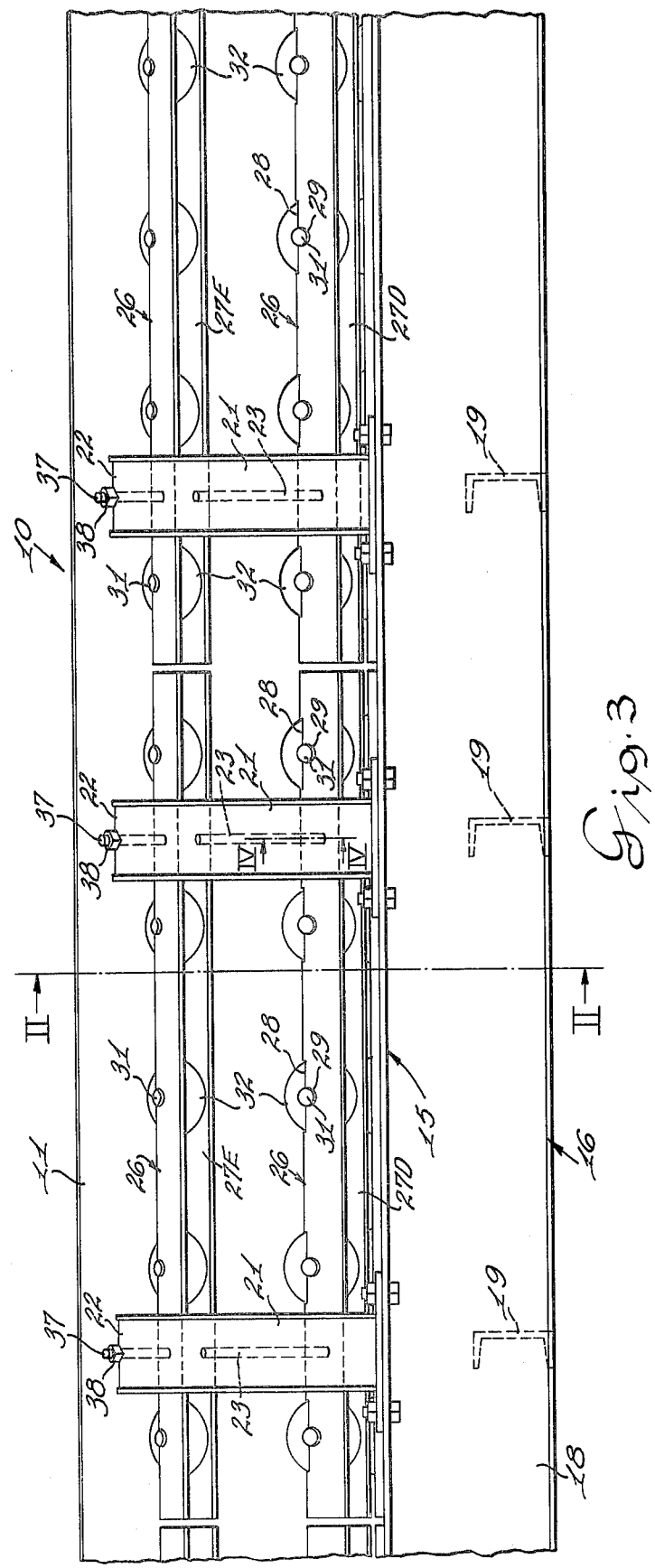

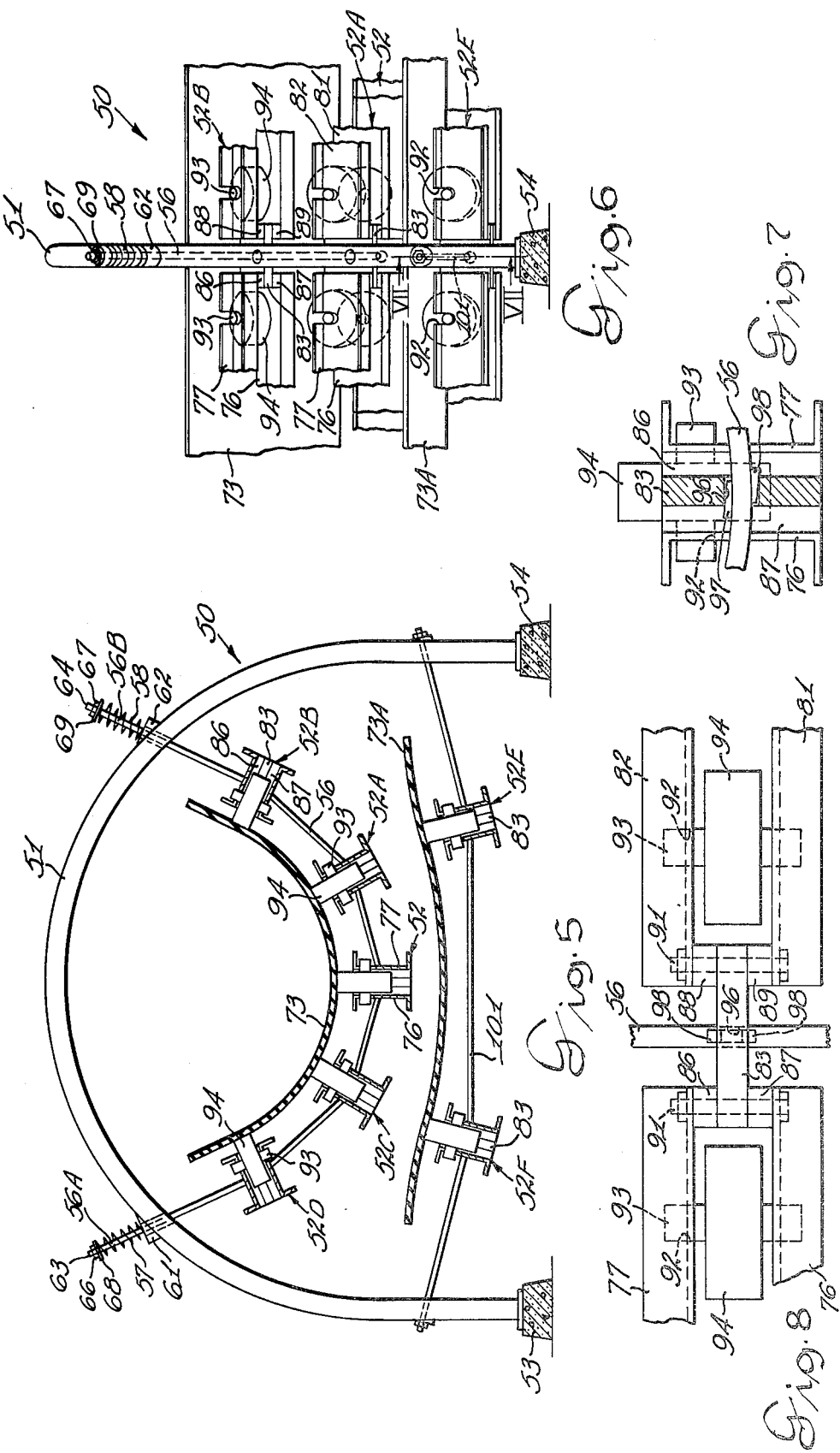

LONGITUDINAL SUPPORT FOR A CONVEYOR BELT

BACKGROUND OF THE INVENTION

The belt conveyor is the single most important bulk material handling product and one of the oldest means for continuous moving of bulk materials. Initially it was designed and developed for in-plant use, primarily because of its ability to handle materials on a continuous basis. This eliminated older batch handling methods that not only used excessive power but were limited in capacity.

Over the years refinements in its hardware have been made, such as the application of anti-friction bearings in the conveyor support idlers, refinements in the sealing protection for the bearings, refinements in the construction of the belt itself and many others, all tending to broaden the application of the conveyor and make it an extremely reliable means of transportation.

The evolution of belt conveyors for high tonnage rates over long distances can be traced from the use of narrow belts at low speed, to wider belts, to still wider belts with larger load carrying cross sections, to higher speed belts, to very long steel cable belts capable of running at high speeds carrying large cross sectional loads.

Developments in machinery and belting moved forward together, from narrow 24 to 30 inch belts on idlers with concentrator roll angles of 20° running at speeds of 300 to 400 F.P.M. over a distance of a few hundred feet, to 72 to 96 inch belts with idlers of 45° concentrator roll angles operating at speeds as high as 1200 F.P.M. over distances in excess of ten miles in a single flight.

Just as the belt conveyor replaced in-plant batch handling, it is now replacing on-site batch handling at large earth or mineral moving operations and the transportation requirements are enormous. The on-site moving of millions of tons of earth to reach the desired commodity must be undertaken. Due to lesser concentration, more mined earth must be handled to obtain an equivalent amount of valuable ore. The distance necessary to move the ore to major transportation centers is greater because of the remote location of the deposit.

Basic design concepts, established during the development of in-plant use, have been refined for present day applications. Belt conveyors are now moving materials on a continuous basis, first, to meet the demands of increased size and overall operating efficiency of high capacity continuous excavators, and, second, to replace expensive inefficient mobile equipment such as trucks. Conveyors not only have the capacity to handle these large tonnage rates, but can do so at a lower cost per ton mile than other batch handling equipment. Broadening the scope of belt conveyor applications has resulted from increased operating speeds, increased sectional loading on the belt, and improved tension members of the belt. All three of these factors result in improved operating efficiencies, reduced initial costs and reduced operating costs.

Belt speeds have steadily increased over the years. Not too long ago speeds of 400 to 600 F.P.M. were common. Today it is not uncommon to see belts running up to 1200 F.P.M. Experimentally belts have been run as high as 2000 F.P.M.

In coping with speed limitations, conveyor designers have directed their attention primarily to problems at the terminals and not to the carrying run of the belt. Loading and discharge at high speeds must be given special attention to reduce chute wear, prevent plug-ups, direct the load to the center of the belt, provide for material acceleration to belt speed, minimize spillage, and minimize belt cover wear. As experience and skill solved one problem after another at the transfer points, bolder and bolder attempts toward higher and higher speeds were made. The main body of the conveyor, the section between the terminals, has been thought of as generally problemless as long as the terminals could be successfully negotiated. Recent experiments at high speeds have disproven this and may have determined that action of the material on the belt as it passes over the belt carrying idlers will determine the practical maximum speeds of belt conveyors for current belt conveyor design concepts.

Ever since the inception of the belt conveyor, the supporting idlers have been a series of rollers placed at right angles to the belt. These supporting idlers are spaced along the run of the belt at intervals of approximately four to five feet, or greater if the belt is under high tension. Obviously, a loaded belt has a tendency to sag between the spaced idlers, and it is this sag that dictates the maximum spacing of the idlers under the belt. A loaded belt moving across these spaced idlers at high speeds creates a wave in the material as it passes over each idler along its entire length. Under these conditions, a load in the belt is given vertical acceleration as it approaches each supporting idler to the extent that the load actually leaves the belt and repositions itself on the belt some distance upstream in the direction of travel. This throwing and catching action affects the material at each idler location. While the fact that the material leaves the belt and repositions itself is of no major consequence except that it does consume power, it is the phenomenon that takes place when the material repositions itself that is of concern. In repositioning, the material tends to build up a wave. Ultimately, on long conveyors the wave becomes so pronounced that at its crest the cross sectional load on the belt becomes excessive and spillage occurs, while a bare spot is created in the trough of the wave. This spillage, of course, would be intolerable. Such a condition begins to take place at belt speeds of 1800 to 2000 F.P.M. with conventional idler spacing.

The volumetric load carrying capacity for a given belt is the result of the contoured cross section of the trough and the speed of the belt, assuming the speed to be within the wave producing speed limit. The cross sectional load is determined by the cross sectioned contour formed at the troughing idlers.

For many years conveyor belts were made of cotton duck as the main tension carrying member with the weight of the duck and the number of plies determining the tension capability. Naturally, as the plies of the belt built up, the lateral stiffness increased. This lateral stiffness created a restriction on the maximum angle of the concentrator roll of the idler, thereby restricting the cross sectional load carrying ability of the belt. For many years, the troughing angle of a conveyor idler was limited to 20° for "high capacity conveyors." Today, as a result of the development of manmade fibers and steel cord construction, lateral flexibility is maintained practically independent of the tension member requirement, which allows for greater troughing angles on the idlers even up to 45°. Many installations are now in operation which do use the 45° concentrator roll angles, but a deteriorating condition on the belt exists in the longitudinal flexing area where the idler center roll meets the concentrator roll.

When a troughed belt is loaded with material, a catenary sag is created between the idler supports and, as a result, at each idler the belt is caused to conform to an unnatural compound bend. The relatively stiff cross section formed by the deeply troughed thin belt, coupled with the catenary sag between idlers, is unable to yield to this unnatural condition. The center section of the belt in contact with the center roll flattens out and rides on the full width of the center roll. Where this flattened section joins the lateral troughed sides, a highly stressed deteriorating buckle is created. This condition is generated in the belt at each idler location, resulting in many stress cycles as the belt moves down the conveyor. Thus, while it is possible to use 45° troughing idlers, prudent judgment suggests 30° or 35° idlers to extend belt life, even though there would be some sacrifice in conveyor capacity.

The theoretical maximum cross sectional load, the limit we should identify, requires the belt to be troughed in a continuous arc as shown in FIG. 1. This configuration cannot be achieved by the present conventional three roll idler. The closest approximation would be multiple rolls as exemplified in U.S. Pat. Nos. 3,880,275; 3,757,930 and 2,833,395, with economics dictating the actual practical number.

As previously stated, the evolution of conveyor belting has been the improvement of the tension carrying members while maintaining lateral flexibility. The allowable working tension of the belt is the factor which controls the maximum length of a single conveyor. Obviously, on long overland belt systems the longer the individual conveyors the fewer the terminals. Terminals are not only costly in initial investment; they are costly items of maintenance.

As a result of the development of belt tension members from cotton duck to high strength steel cord, belt lengths have increased from a few thousand feet to as long as ten miles. Even with steel cords, there will be some limit on the maximum length of a single flight conveyor. As yet, this may not have been determined, but it must be recognized that there will be some physical and economical limits.

The straight line conveyor run limitation is a factor that must be recognized. Training of a belt to run on the centerline of carrying idlers is important, as load spillage results if the belt wanders off to the side. In addition, the edges of the belt are likely to encounter fixed obstacles along the path or at head or tail terminals, resulting in tearing and fraying and ultimately the deterioration of the entire belt. Accurate alignment of idlers is therefore extremely important, especially when a belt is carried by fixed rigid frame support idler rolls.

As indicated, the speed limitation is caused by the "hump" that is created in a belt at each idler support, causing the material on the belt to reposition itself. The greater the spacing the larger the hump and, conversely, the smaller the spacing the smaller the hump. If the spacing were reduced to the ultimate—continuous support—the problem would be completely eliminated. Naturally, economics must be considered, and it would not be practical to space idlers so close as to approximate a continuous support. However, closer spacing to increase speed may have economic benefits.

The cross sectional load on the belt can be improved by adding more rolls to an idler, but additional rolls do not offer enough improvement to justify the added cost. A true catenary type idler with multiple rolls as supports could achieve the ultimate in cross sectional loading. Naturally, economics dictate the most practical number of rolls acceptable for long overland conveyor systems.

SUMMARY OF THE INVENTION

The concept of individual longitudinal channels, equipped with closely spaced wheels running the full length of the conveyor and suspended in a natural catenary fashion by cross support cables is herein set forth. With this new design concept, many limitations of the present belt conveyor are eliminated or at least broadened to a considerable degree.

With the present art of cross belt support, speed restriction is caused by the hump at the spaced idlers. In the new concept, the closely spaced rollers in longitudinal alignment provide for practically continuous support, thus substantially increasing speed possibilities. The concept not only broadens the speed restriction, but it also minimizes the wasteful horsepower of internal particle friction of the bulk material which is constantly changing position as it moves over the spaced idlers.

Belt conveyor restrictions in load carrying are the result of a compromise between belt life and volumetric capacity. In the new concept, the catenary formed by the cable suspension creates the ideal cross section for volumetric load carrying capabilities. At the same time, it eliminates the belt deteriorating buckle created by the concentrator and center roll of the cross belt support. The new design allows for maximum cross section of load for a given width of belt without any belt destructing buckles.

The same catenary suspension provides for maximum belt training by allowing the placement of the load on the belt to determine the natural cross section contour of the belt. This condition maximizes the self-training feature proved by the three roll pinned connected garland type idler. Greater flexibility in conveyor layout, minimal terminal cost, maximum belt training capability, maximum capacity and reduced maintenance are all achieved by this feature.

The channel design concept provides many new functional features all directed at increasing the scope of application of the belt conveyor, thus maximizing the potential future of the belt conveyor in bulk material transportation.

Presently, there are literally hundreds of combinations and configurations of cross belt support idlers required to service the industry. Each configuration of belt width and troughing angle requires rolls of varying lengths and diameters. In addition, each of these rolls are available in various options as to bearing and seal. Also, each configuration of belt width and troughing angle must be complimented with self-training idlers, impact idlers and return belt idlers. Obviously, all this results in large inventories with limited production runs of each.

In the channel strip concept, the channels for all belt widths, for all load weights and for all trough angles would be the same. To accommodate the varying belt widths, the number of channel supports could be varied. To accommodate variations of material densities, the number of channels could be varied. To change the trough contour (if desired), the cable length could be varied or the structural supports spread. All variables are accommodated by using one channel design and one roller size. It is apparent that production economics would be many.

In addition to manufacturing benefits, erection costs would also be reduced. In erecting a conveyor employing cross belt support idlers, each idler must be aligned at an exact right angle to the belt. Considerable time is spent in this effort. With the channel strip support, longitudinal alignment is all that is necessary. Because of the catenary support, the self-training feature minimizes the requirement for accurate alignment and protects the belt from sidewise wandering.

DESCRIPTION OF THE DRAWINGS

FIG. 3 is a view in side elevation of the conveyor belt of FIG. 1;

FIG. 4 is an enlarged sectional view of the roller and cable arrangement taken in a plane represented by the line IV—IV in FIG. 3.

FIG. 5 is a view in vertical cross section through a modified form of the invention for a fixed location overland conveyor;

FIG. 6 is a view in side elevation of the modified belt conveyor as viewed from the right in FIG. 5;

FIG. 7 is an enlarged sectional view of the roller and cable arrangement taken in a plane represented by the line VII—VII in FIG. 6;

FIG. 8 is an enlarged fragmentary view of the joint space between sectionalized support channels at a frame and is shown as viewed from the bottom;

DESCRIPTION OF THE INVENTION

Figure 1:
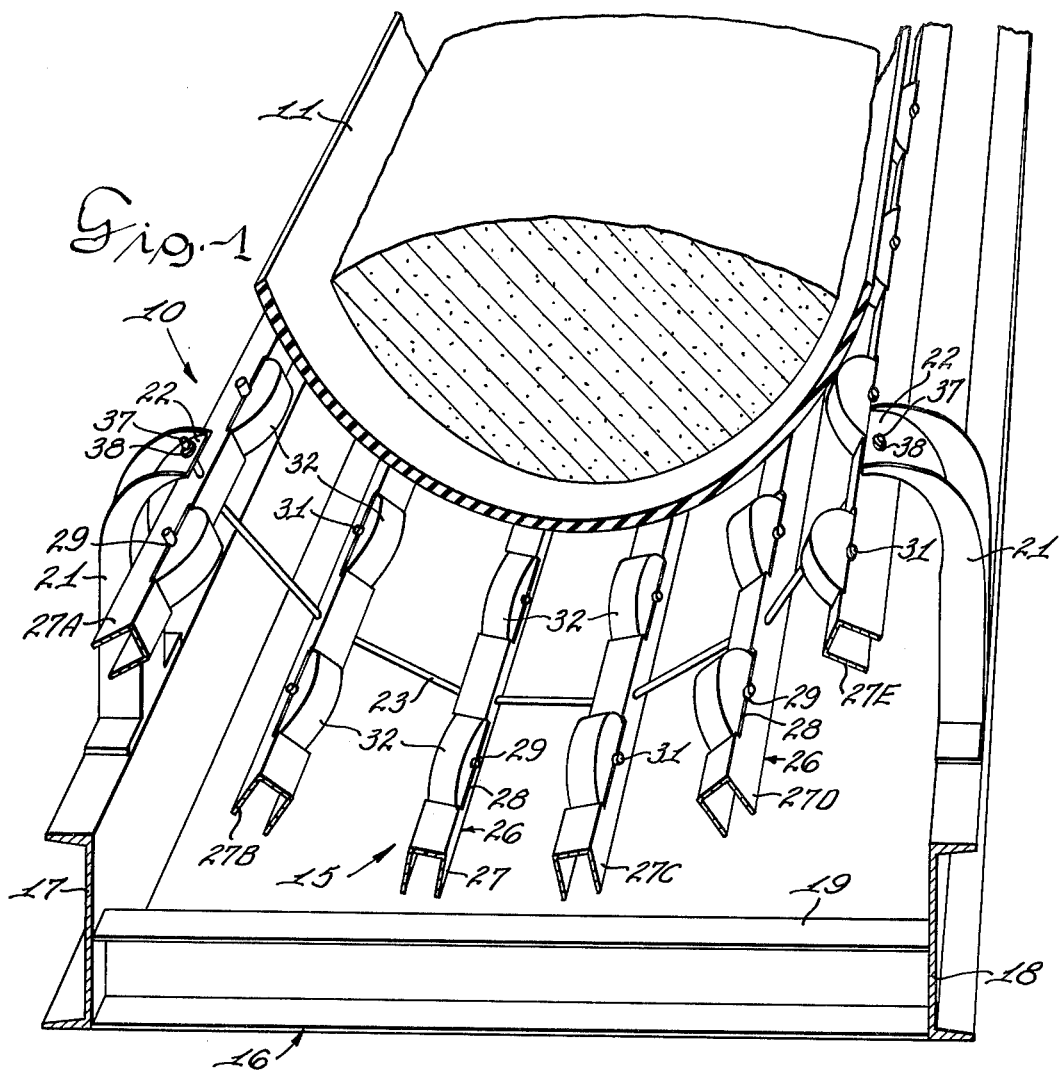
FIG. 1 is an enlarged fragmentary view in perspective of a conveyor belt incorporating the longitudinal support of the present invention.
Figure 2:
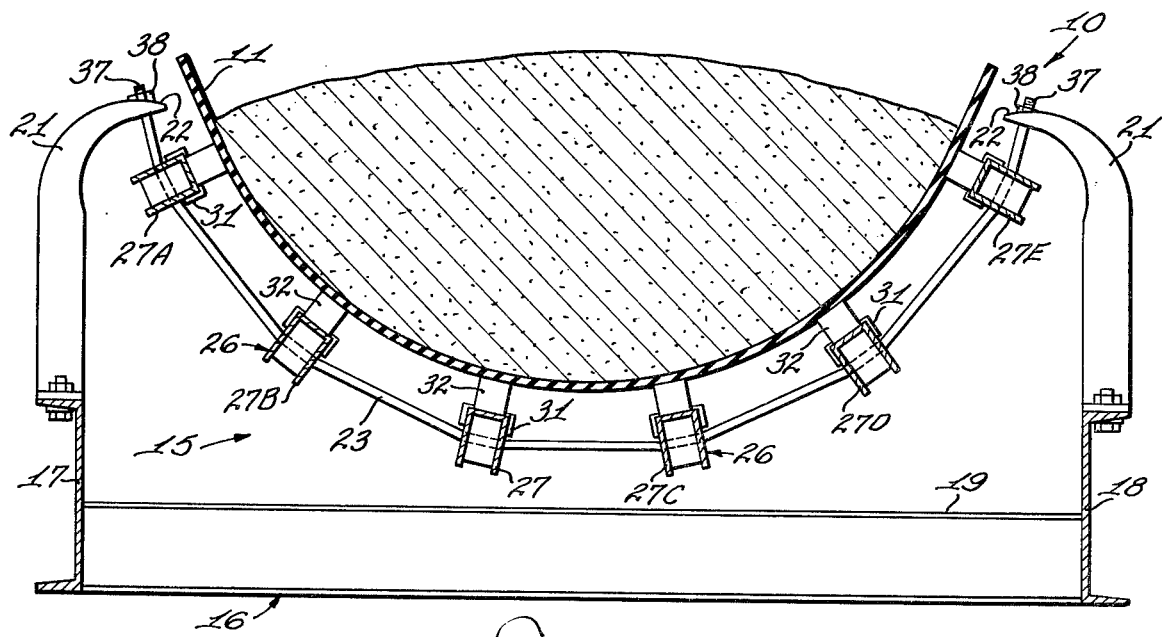
FIG. 2 is a view in vertical section through the conveyor belt taken in a plane represented by the line II—II in FIG. 3.

A traveling conveyor 10 having an endless belt 11 of any well known belting material. In prior apparatus, the main body of the conveyor belt, i.e., the section between terminals, presents problems, especially at high speeds, which affects the load carrying capacity of the belt. The problem arises in the action of the material on the belt as it passes over the belt carrying idler rollers and determines the practical maximum speed of the belt. Belt supporting idlers have been a series of rollers placed at right angles to the belt and spaced at intervals of four or five feet. A loaded belt has a tendency to sag between the spaced idlers, and it is this sag that governs the maximum spacing of the idlers under the belt. A loaded belt moving across the spaced idler rollers at relatively high speeds creates a wave form in the material as it passes over each idler set along its entire length of travel. This wave form gives the material on the belt a vertical acceleration as it approaches each supporting idler. This vertical acceleration is sufficiently severe to cause the material to actually leave the belt and reposition itself on the belt in an upstream direction. The material, in repositioning itself, tends to build up a wave which, on long conveyors, becomes so pronounced that at its crest the cross sectional load on the belt becomes so excessive that spillage occurs and a bare or empty zone is created in the trough of the wave. This condition, of course, reduces the effectiveness and the load carrying capacity of the conveyor. It is, of course, obvious that a true catenary type idler with multiple rolls as supports spaced close together could achieve the ultimate in cross sectional loading. However, economics dictate the practical number of idler rollers that are acceptable in long conveyor systems.

The present invention is the concept of individual longitudinal channels equipped with closely spaced wheels running the length of the conveyor and suspended in a natural catenary fashion by relatively flexible cross suspension members.

To this end, there is provided a belt supporting means 15 comprising a supporting frame 16. The frame 16 includes longitudinally extending spaced apart side beams 17 and 18. Each of the side beams 17 and 18 will, of course, be formed in sections which are welded or bolted together to accommodate the length of the belt run. The side beams 17 and 18 are reinforced by means of transverse beams 19. Upstanding from the top flange of the side beams 17 and 18 are stanchions. At their upper ends the stanchions 21 are in-curved to provide a terminal or supporting point 22 for a flexible holding member 23, which herein is depicted as a stranded cable.

Extending parallel to the direction of run of the conveyor belt 11 are a plurality of longitudinally extending belt support means 26. The belt supporting means 26 are identical and each includes a U-shaped channel frame 27. As indicated in FIG. 3, the channel frames 27 are sectionalized for ease of installation. However, for all practical purposes, they can be considered as being continuous.

Spaced along the channel 27 are cutouts or wells 28 as shown in FIG. 1. The sides of each of the channel frames 27 at the center of the wells 28 are provided with semi-circular grooves 29. These grooves are disposed in pairs which are diametrically opposite each other and receive laterally extending stud shafts 31 of belt support rollers 32. Thus, the longitudinally extending roller belt supporting means 15 are of simple construction which materially reduces the cost of manufacture. In addition, maintenance of the supporting means when necessary is easily accomplished, requiring no special tools or equipment, and can be readily performed on-site.

The individual supporting members 27, 27A, 27B, 27C, 27D and 27E are supported in operative spaced apart position by the cables 23, as previously mentioned. To this end, the sides of the U-shaped channel frames 27 are each provided with slightly oblong-shaped openings 36 which are diametrically opposite each other. Each of the supports 27 are provided with a plurality of pairs of openings 36 which are spaced along the channel frames and located opposite the stanchions 21. The cable 23 is threaded through the pairs of openings 36 in each of the channel frames 27 through 27E with each end of the cable 23 being securely fastened in the associated stanchion 21. To this purpose, the ends of the cable 23 are provided with a threaded thimble end portion 37 which extends through a suitable opening provided in the portions 22 of the stanchion. Nuts 38 threaded on the thimble ends of the cable 23 secure the ends to the stanchion.

To maintain the U-shaped channel frames 27 in spaced apart parallel relation, simple holding means are provided. As best shown in FIG. 4, wedge members 41 are driven into the space between the wall surface of the openings 36 and the surface of the cable 23. These wedges 41 are easily inserted into position or removed therefrom so as to simplify positioning, realigning or dismantling of the supporting channel frames as may be required.

By providing a flexible channel frame supporting means such as the cable 23, a support is provided which conforms to the conveyor belt load. The simplified construction facilitates maintenance and materially reduces the cost of manufacturing and installation.

The invention so far described relates generally to conveyors capable of moving a large volume of bulk over long distances. However, it must not be overlooked that the basic functions of a belt support device are:
 (1) to trough the belt to receive the load;
 (2) to support various widths of belts;
 (3) to support various weights of materials;
 (4) to absorb impact at loading points; and
 (5) to keep the belt trained on the centerline of the conveyor structure.

The first three of the above-stated basic functions have been met with the concept so far disclosed.

To meet the other functional requirement, spring loading of the catenary support cables could serve as the impact absorbing element at loading points. Belt training may be achieved by the catenary cable support, or by slanting the outer longitudinal channel members toward the center of the belt in the direction the belt is moving.

With these refinements, it appears that all the functional requirements of a belt supporting device have been met. But the device must also be sufficiently versatile to be readily adaptable to the various types of supporting structures on which conveyors are mounted. For that reason, it is necessary to identify the types of supports employed. It is believed that most all conveyors can be classified by the following means of support:
 (1) overland fixed location;
 (2) overland shiftable;
 (3) structural truss supported;
 (4) overhead supported (underground mines); and (5) portable.

FIGS. 5 and 6 illustrate a design for a fixed location overland conveyor. In this design, a plurality of curved frames such as the frame 51 of conveyor 50 would be spaced at intervals to suit the length of the common longitudinal belt support means 52 through 52D. Calculations indicate these support means to be approximately 15 to 16 feet in length with a corresponding frame spacing. With this configuration, there would be no need for additional structural members between frames. In present conventional fixed location overland conveyors, the cross belt idler frames are closely spaced at approximately 4 feet and must be supported on longitudinal structural members over the entire length of the conveyor in addition to the pier supported frames.

A frame 51 is secured to fixed bases 53 and 54 which herein disclose a concrete basis. Yieldably secured to the frame 51 is a flexible holding member herein disclosed as a braided wire cable 56. As shown, the ends 56A and 56B of the cable 56 pass through suitable openings in the frame. Each end 56A and 56B receives a compression spring member 57 and 58, respectively. The compression spring arrangement is especially useful at loading or other points for absorbing impact. But the compression spring arrangement need not be utilized along the carrying run of the conveyor. Each of the spring members seat on an associated pad 61 and 62 formed on the frame 51. The outer or free ends 63 and 64 of the cable 56 receive a securing means such as a nut 66 and 67 which abut plate discs 68 and 69 against which the associated springs 57 and 58 abut. Thus, adjustment of the cable 56 may be easily effected by tightening or loosening the nuts as conditions indicate.

Extending parallel to the direction of run of a conveyor belt 73 are a plurality of longitudinally extending belt supporting means 52. The supporting means are identical and each include a pair of longitudinally extending channel members 76 and 77 arranged in spaced apart pairs. The channels 76 and 77 extend between adjacent support frames 51. Thus, the channels 76 and 77, as depicted in FIG. 6, are sectionalized and are maintained in spaced apart connected relationship with respect to adjacent continuing channels such as the channels 81 and 82 by operation of a tie plate 83. The tie plate 83 has on each side thereof abutment blocks 86 and 87 and 88 and 89 as shown in FIG. 8. These abutment blocks extend the entire height of the channels and serve as spacing fillers against which the channels abut in secured relationship as by bolts 91 or by being welded thereto.

Spaced along the channels 76–77 are axle grooves 92 arranged in diametrically opposite pairs and which are adapted to receive the laterally extending ends of axles of shafts 93 of belt support rollers 94. Thus, the longitudinally extending roller belt supporting means 52 are of simple construction which reduces cost both of manufacturing and in-service maintenance.

The individual supporting means 52 are carried in operative spaced apart relationship by the cables 56 which are yieldably supported in transverse relationship to belt travel by each frame 51. To this purpose, the cable 56 passes through a suitable opening 96 formed in the tie plate 83, as depicted in FIG. 7. Wedge blocks 97 and 98 serve to releasably lock the supports 52 in operative position to the supporting cable 56.

The return run of the conveyor belt 73A is supported by support means 52E and 52F which are duplicates of the load support means previously described. The ends of each of the belt return run support means 52E and 52F are coupled together by operation of tie plates 83 which are similar to the tie plates 83. A cable 101 extending between the legs of the frame 51 passes through the tie plates 83 thereby supporting the return run supports 52E and 52F in operating position.

Figure 9:
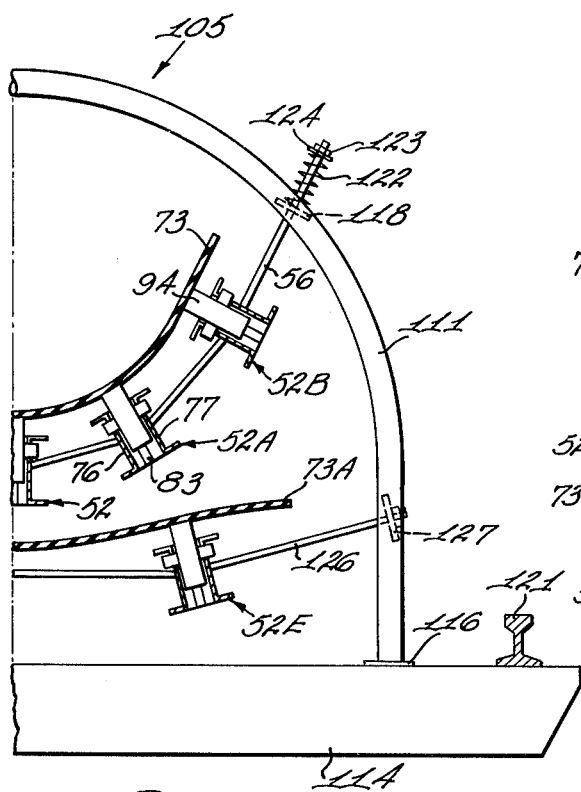
FIG. 9 is a fragmentary view in vertical section through a modification of the belt conveyor of FIG. 5 as conceived for a shiftable overland conveyor.
Figure 10:
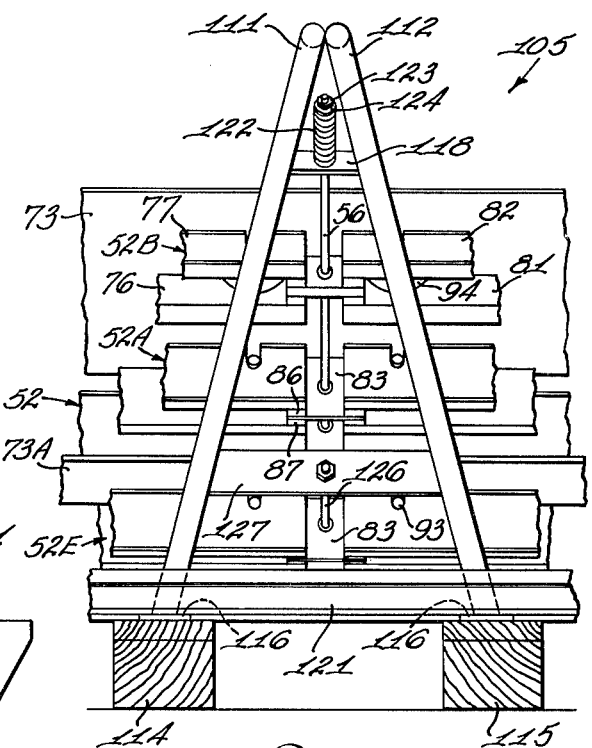
FIG. 10 is a view in side elevation of the modified belt conveyor of FIG. 8 as viewed from the right side thereof.

FIGS. 9 and 10 illustrate a shiftable overland conveyor supporting structure 105. It is similar to the fixed conveyor of FIGS. 5 through 8 but is skid mounted and equipped with a longitudinal rail for shifting. The present conventional design is a rigid structural frame section with closely spaced idlers mounted on the section. Each section is connected by a longitudinal rail for shifting.

The supporting structure 105 as illustrated in FIGS. 9 and 10 includes a pair of frame members 111 and 112 which are inclined towards each other so that their respective arc tops abut. The abutting tops of the frames 111 and 112 may be secured together if so desired to provide a more rigid "A" frame type construction.

However, the securing at the top is optimal depending on on-site factors.

The frames 111 and 112 are securely mounted on skids 114 and 115 to provide mobility to the conveyor system for relocation without dismantling. To this purpose, the feet of the frames 111 and 112 are provided with plates 116 through which spikes or bolts are driven into the skids. A rail 121 is secured to the skids and is adapted to span the skids.

In the arrangement disclosed in FIGS. 9 and 10, the belt support means 52 are identical to support means 52 of FIGS. 5, 6, 7 and 8 and further description is not deemed necessary. Generally, the channels 76 and 77 of each of the support means 52 are secured together by means of the tie plate 83 as previously described. In the modified form of the present invention, the supporting flexible cable 56 passes through suitable openings formed in the tie plate 83 of the support means 52. Securing the support means 52 in operative position on the cable 56 is accomplished by the wedge blocks 97 and 98 described in conjunction with FIG. 7.

In the modified embodiment, FIGS. 9 and 10, the cable 56 extends through plates 118, one of which is shown, welded across the upper portions of the frames 111 and 112. Thus, the plate 118 spans the space across the frames in a direction parallel to the run of the conveyor belt 73. The arrangement shown in FIG. 10 is exactly the same for the opposite side of the frames, not shown. The ends of the cable 56 extend through the associated plate 118 as depicted in FIGS. 9 and 10. A spring 122 is shown mounted about the extending end of the cable and abuts the plate 118. A nut 123 is threadedly engaged on the end of the cable and abuts a disc 124. The same arrangement is provided for the opposite end of the cable (not shown). While the cable 56 has been shown as anchored to the spring 122 it need not be but may be directly secured to the frame 111 if so desired. Thus, the cable 56 is suspended substantially on a plane which passes through the joint space of the abutting top faces of the frames. With this arrangement, a power tractor or other power sources may be connected to the rail 121 and the skids pulled into a desired new location. With the arrangement disclosed, both skids move simultaneously and thus the frames 111 and 112 between sections of the support means 52 are not stressed nor are the support means.

In FIGS. 9 and 10 the return run 73A of the conveyor belt 73 is supported in the manner previously described. However, the cable 126 to which the return run support means 52E are secured has its ends secured in a cross plate 127 as shown.

Figure 11:
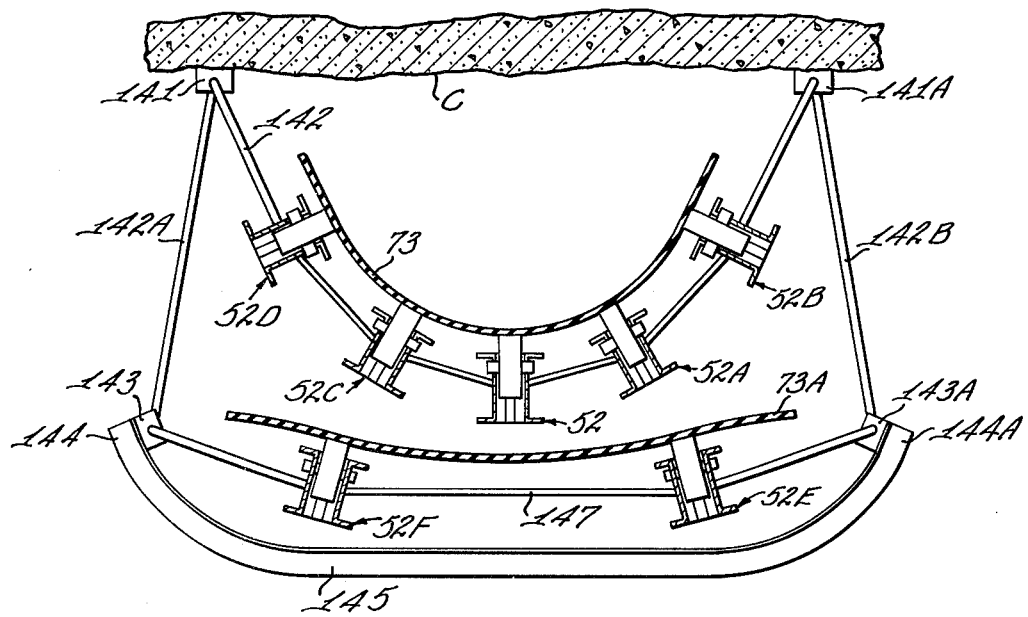
FIG. 11 is a view in vertical section through yet another modification of the belt conveyor, showing overhead mounting for utilization in underground mines.

For overhead mounting, which facilitates installation in underground mines, a modified concept of the invention is disclosed in FIG. 11. As there shown, overhead anchors 141 are utilized and will be located along the conveyor at spaced intervals which are equal to the length of the belt supporting channel sections. As shown, the anchors 141 and 141A are imbedded in the mine ceiling "C." A flexible supporting cable 142 is threaded through suitable openings in each anchor and passes downwardly through anchors 143 and 143A. The anchors 143–143A are secured to opposite ends 144 and 144A of a fabricated steel cradle member 145. As shown, the cradle members 145 are formed so that the outer end portions thereof are bent upwardly. Thus, the ends 144–144A to which the anchors 143–143A are secured are disposed outside of a vertical plane which is parallel to the axes of the belt run and pass through the openings in the anchors 141–141A. With this arrangement, the runs 142A and 142B of the cable 142, after passing through the anchors 141–141A, respectively, pass through the anchors 143–143A, respectively. Since the spacing between the openings in the anchors 143–143A is greater than the spacing between the openings in the anchors 141–141A, the cable runs 142A–142B each are inclined outwardly away from the vertical centerline which passes through the center of the conveyor belt 73. The cable runs 142A and 142B pass through suitable openings in the cradle anchors 143–143A and are secured together at a position below the return run 73A of the conveyor belt. Thus, the load supporting means 52 through 52D are carried on the cable 142 and secured thereto in operative position by wedges as previously described. The belt return support means 52E and 52F are secured in position to the lower horizontal run 147 of the cable also as previously described.

With the arrangement disclosed in FIG. 11, the entire conveyor assembly, including the cradle 145, can be supported from the mine tunnel roof leaving the area beneath the conveyor clear. This eliminates expensive and cumbersome floor supports.

The invention described provides a contoured cross section of the load carrying belt which is troughed in a continuous arc. This provides for a maximum cross sectional load carrying capacity for a given width of belt. The arrangements disclosed also provide for simple belt supporting means which are relatively inexpensive and are easily adjusted for training the belt to run on the centerline of a run. The arrangement also provides for a relatively true catenary type of belt supporting idler so as to achieve the ultimate in cross sectional loading. The spaced roller supporting means in longitudinal alignment provide for practically continuous support. This makes it possible to increase the belt speed and minimizes the wasting of horsepower which is attributed to internal particle friction of the bulk material which in the past was constantly changing position as it moved over spaced idlers.

The embodiments of the invention in which an exclusive property or privilege is claimed are defined as follows:

1. In a belt conveyor;
    a frame;
    an endless belt of a flexible material;
    a support for said belt including a plurality of pairs of spaced apart, longitudinally extending frame channel members arranged in spaced-apart back-to-back relationship, said pairs of channel members having a plurality of diametrically related wells spaced along the longitudinal length of said channel members;
    spacers between said channel members operative to maintain said channel members in parallel, spaced-apart relationship, each of said spacers being located at the ends of the sections of said channel members and arranged so as to be common to the adjacent ends of adjacent channel members;
    a roller support having laterally extending shaft members supported in each related pairs of said wells and in position to engage the undersurface of the load run of the flexible endless belt;
    flexible stranded steel cable cross-suspension members spaced along and connected to said frame, said flexible cable passing through preformed openings provided in said spacers at a point between adjacent channel sections and operative to support said pairs of channel member sections in longitudinal, straight-line relationship relative to each other to maintain said supporting rollers in supporting engagement with said belt; and, locking means engageable within the openings in said spacers and with said flexible stranded cable to lock said channel member sections in longitudinally aligned, spaced-apart parallel relationship.

2. In a belt conveyor;

a frame;

an endless belt of a flexible material;

a support for said belt including a plurality of spaced-apart, longitudinally extending frame members, said frame members each include a pair of longitudinally extending channel members arranged in spaced-apart, back-to-back relationship, said channel members of each of said frame members being formed in sections, said pairs of channel members having a plurality of diametrically related wells spaced along the longitudinal length of said channel members;

spacers between said channel members operative to maintain said channel members in parallel, spaced-apart relationship, each of said spacers being located at the ends of the sections of said channel members and arranged so as to be common to the adjacent ends of adjacent channel members;

a roller support having laterally extending shaft members supported in each related pair of said wells and in position to engage the undersurface of the load run of the flexible endless belt;

a flexible support means connected to said frame and extending transversely to the run of the conveyor belt, said flexible support means being operably connected to maintain said frame members in catenary supporting relationship with respect to said conveyor belt and to support said pairs of channel members in longitudinal, straight-line relationship relative to each other to effect the supporting engagement of said rollers with said conveyor belt, said flexible support means passing through said spacers and being operatively connected to maintain said channel members of said frame members in longitudinally aligned, spaced-apart parallel relationship; and, locking means engageable with said flexible support means and said spacers to effectively lock said spacers to said flexible support means.

3. A belt conveyor according to claim 2 wherein there is provided a U-configured frame, said U-configured frame being disposed so as to span said conveyor belt and located in a vertical plane which is transverse to the run of the conveyor and passes through the U-configured frame also passes through said spacer at a point between adjacent ends of adjacent frame members;

said flexible support means being a cable having its ends secured to said U-configured frame; and spring means connected to each end of said flexible support means and to said U-configured frame to yieldably secure said flexible support means to said U-configured frame to provide a yieldable loading of the catenary flexible support means.

4. A belt conveyor according to claim 3 wherein there is provided a pair of U-configured frames, said frames being inclined inwardly towards each in a manner that their arcing top portions engage each other;

a cross plate on each side of said pair of U-configured frames and spanning the adjacent legs of each of said U-configured frames, said cross plates being located in a horizontal plane which passes above said belt conveyor, said cross plates serving as anchors against which said cable end securing means abut;

a first movable skid disposed below said belt conveyor transversely to the run of the belt, said first skid receiving the foot ends of one of said U-configured frames to positionably carry said one U-configured frame, a second movable skid disposed below said belt conveyor transversely to the run of the belt and substantially parallel to said first skid, said second skid receiving the foot ends of the other of said U-configured frame to positionably carry said second one of said U-configured frame; and rigid means secured to said first and second skids, said rigid means being contructed and arranged to span said skids in a direction parallel to the run of the belt, whereby said rigid means may serve as a securing member a power means to effect a lateral shifting of said belt conveyor.

5. A belt conveyor according to claim 3 wherein there is provided flexible support means carriers which are adapted to be secured into the ceiling of a tunnel in which said belt conveyor is disposed;

a bottom cradle below said belt conveyor, said cradle having its ends extending outwardly of a vertical planes which are parallel to the run of the conveyor belt and located outwardly from said carriers;

said flexible support means to which said spacers are secured for supporting frame members in operating positions being secured to said ceiling carriers to form said flexible support means in a catenary arrangement for movably supporting the load run of said belt, said flexible support means running downwardly from said ceiling carriers to be secured to the extending ends of said bottom cradle, said flexible support means extending inwardly from the ends of said bottom cradle to form an endless loop, said portion of said flexible support means which extends inwardly from the ends of said cradle being arranged to carry at least a pair of said longitudinally extending frame members for supporting the return run of said belt.

* * * * *